(12) United States Patent
Wojcieszak et al.

(10) Patent No.: US 6,959,379 B1
(45) Date of Patent: Oct. 25, 2005

(54) MULTIPLE EXECUTION OF INSTRUCTION LOOPS WITHIN A PROCESSOR WITHOUT ACCESSING PROGRAM MEMORY

(75) Inventors: Laurent Wojcieszak, Meylan (FR); Andrew Cofler, Voreppe (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/562,542

(22) Filed: May 2, 2000

(30) Foreign Application Priority Data

May 3, 1999 (EP) .................................. 99410054

(51) Int. Cl.$^7$ ............................................. G06F 15/00

(52) U.S. Cl. ..................................................... 712/241

(58) Field of Search ......................................... 712/241

(56) References Cited

U.S. PATENT DOCUMENTS

| | | | | |
|---|---|---|---|---|
| 4,566,063 A | * | 1/1986 | Zolnowsky et al. ........ | 712/241 |
| 4,714,994 A | | 12/1987 | Oklobdzija et al. ......... | 364/200 |
| 4,727,483 A | * | 2/1988 | Saxe ........................... | 712/241 |
| 4,876,642 A | * | 10/1989 | Gibson ........................ | 712/233 |
| 5,511,178 A | * | 4/1996 | Takeda et al. ............... | 711/125 |
| 5,623,615 A | * | 4/1997 | Salem et al. ................. | 712/238 |
| 5,657,485 A | * | 8/1997 | Streitenberger et al. .... | 712/245 |
| 6,038,649 A | * | 3/2000 | Ozawa et al. ................ | 711/217 |
| 6,145,076 A | * | 11/2000 | Gabzdyl et al. ............. | 712/241 |

FOREIGN PATENT DOCUMENTS

| | | | | |
|---|---|---|---|---|
| EP | 0 487 082 | 5/1992 | ............. | G06F 9/32 |
| EP | 0 511 484 | 11/1992 | ............. | G06F 9/38 |
| EP | 0 864 970 | 9/1998 | ............. | G06F 9/32 |

OTHER PUBLICATIONS

Rosenberg, Jerry M. Dictionary of Computers, Information Processing, and Telecommunications. Second Edition. New York: John Wiley & Sons, Inc. ©1987. p. 161.*
Kloker K.L., *The Mororola DSP56000 Digital Signal Processor*, IEEE Micro, vol. 6, No. 6, Dec. 1, 1986 pp. 29-48, XP000211994, ISSN: 0272-1732.

* cited by examiner

*Primary Examiner*—Eddie Chan
*Assistant Examiner*—Aimee Li
(74) *Attorney, Agent, or Firm*—Lisa K. Jorgenson; James H. Morris; Wolf, Greenfield & Sacks, P.C.

(57) ABSTRACT

A method of executing loops in a computer system is described. The computer system has a sequence of instructions held in program memory and a prefetch buffer which holds instructions fetched from the memory ready for supply to a decoder of the computer system. If the size of the loop to be executed is such that it can by holly contained within the prefetch buffer, this is detected and a lock is put on the prefetch buffer to retain the loop within it while the loop is executed a requisite number of times. This thus allows power to be saved and reduces the overhead on the memory access buffers. According to another aspect, loops can be "skipped" by holding a value of zero in the loop counter register.

12 Claims, 5 Drawing Sheets

MULTIPLE EXECUTION OF INSTRUCTION LOOPS WITHIN A PROCESSOR WITHOUT ACCESSING PROGRAM MEMORY

FIELD OF THE INVENTION

The present invention relates to execution of instruction loops in a computer system.

BACKGROUND TO THE INVENTION

In a computer system, instructions are typically fetched from a program memory, decoded and supplied to an execution unit where they are executed to run the programs stored in the program memory. It is frequently the case where a particular sequence of instructions is required to be executed more than once, sometimes dependent on certain conditional parameters being met. Such sequences are termed herein "loops". Loops can be implemented by software, by instructions which, after the end of a particular sequence of instructions constituting a loop has been reached, cause the first instruction of the loop to be executed again. So-called software loops are assisted by associated hardware, in particular in the form of a loop end register which holds the address of the last instruction in the loop, and a loop start register which holds the address of the first instruction in the loop. By loading these registers, loops can be automatically executed a predetermined number of times by the computer system. That is, if the loop end address is detected, the next address which is fetched from memory is the loop start address. A loop count register holds an initial number which is the number of times the loop is to be executed, and is decremented each time a loop is carried out.

One problem with such hardware loops is that the same instructions are being repeatedly fetched from memory, with consequential use of power and load on the memory access buses.

It is an aim of the present invention to obviate this where possible.

SUMMARY OF THE INVENTION

According to one aspect of the present invention there is provided a computer system for executing loops comprising: a program memory holding a sequence of instructions including at least one loop sequence having a set of loop instructions to be executed a predetermined number of times; a prefetch buffer for fetching instructions from the program memory; means for detecting whether all the loop instructions are in the prefetch buffer and for locking the prefetch buffer against further accesses to the program memory in that case; and means for detecting when the loop has been executed said predetermined number of times and releasing the lock on the prefetch buffer to allow further accesses to the program memory.

According to another aspect of the present invention there is provided a method of executing loops in a computer system, each loop comprising a sequence of loop instructions to be executed a predetermined number of times, the method comprising: fetching instructions from a program memory into a prefetch buffer; detecting whether all the loop instructions are in the prefetch buffer and locking the prefetch buffer against further accesses to the program memory in that case; and detecting when the loop has been executed said predetermined number of times and releasing the lock on the prefetch buffer to allow further accesses to the program memory.

Thus, in line with the described aspects of the invention, it is determined whether or not a loop can fit into the prefetch buffer or not. If it can, it is locked into the prefetch buffer and further fetches from memory are inhibited until the loop has been executed the predetermined number of times. If the loop cannot fit in its entirety into the prefetch buffer, there is no lock and the system operates as normal.

Preferably the prefetch buffer includes a read pointer which successively causes instructions to be supplied to a decoder, and which reads the loop instructions in sequence. When the loop end address is detected, the next address of the read pointer is the loop start address, which will be to an instruction already in the prefetch buffer.

In classic digital signal processors where a hardware loop is implemented, the loop counter register can normally not take the value zero. If it is permitted, it causes the loop to be executed once or an infinite number of times. To provide greater flexibility a further aspect of the invention provides a method of executing instructions in a computer system, the instructions including a loop comprising a sequence of loop instructions to be executed a predetermined number of times, wherein that predetermined number is held in a loop count register, the method comprising: detecting the value in the loop counter register; executing the loop the number of times indicated by the value in the loop counter register wherein when the value in the loop counter register is zero, the loop is not executed.

Thus, a value of zero in the loop counter register allows the loop to be skipped.

For a better understanding of the present invention and to show how the same may be carried into effect, reference will now be made by way of example to the accompanying drawings.

DESCRIPTION OF THE PREFERRED EMBODIMENT

Figure 1:
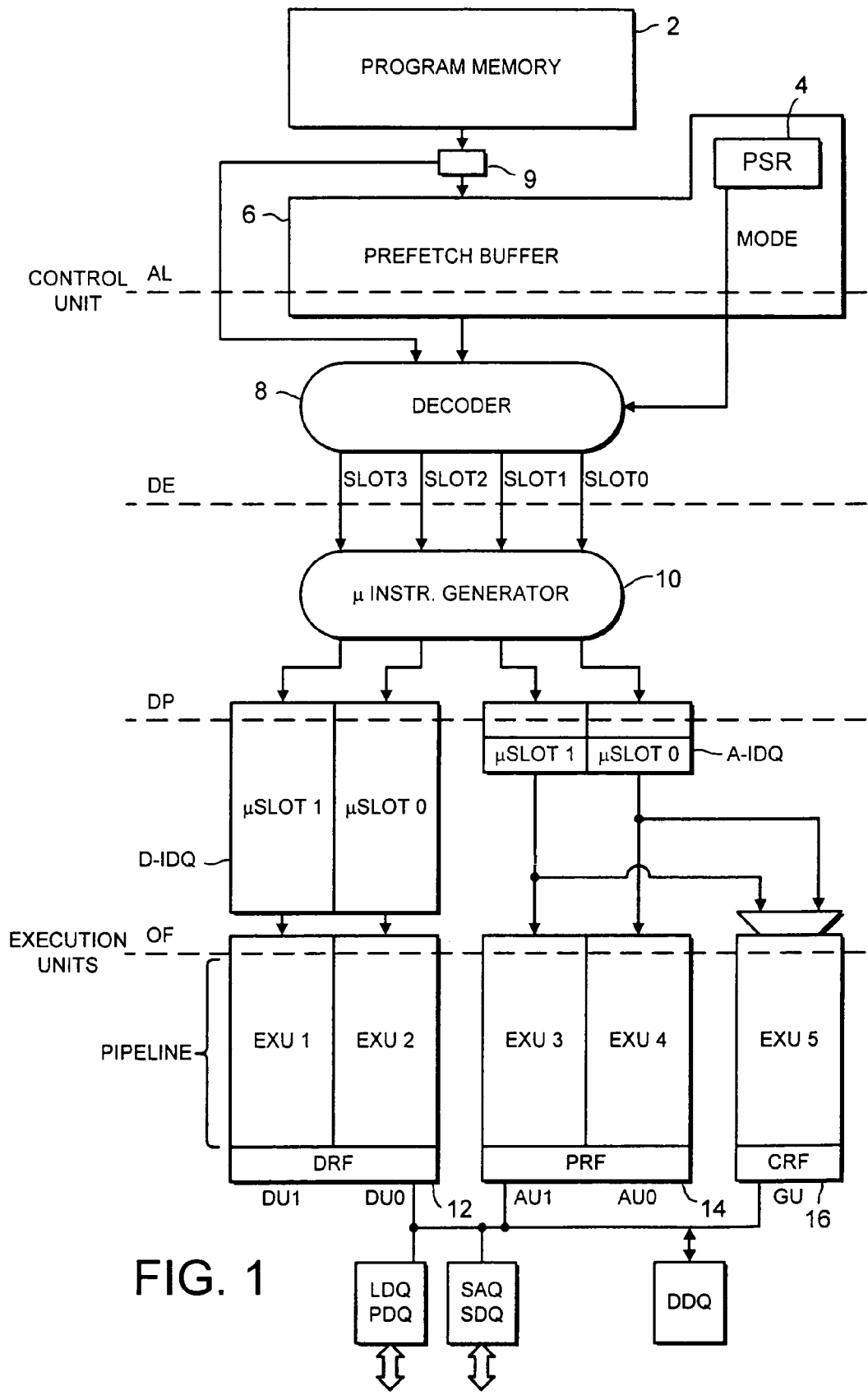
FIG. 1 is a block diagram of a computer system.

FIG. 1 illustrates the main components of a computer system arranged for the parallel execution of a plurality of instructions and particularly suited to provide a high digital signal processing (DSP) performance. A program memory 2 holds instructions in one of three different instruction formats, as described below with reference to FIG. 4. The computer system supports three different modes, one mode for each instruction format. The current instruction mode is held in a process status register (PSR) 4 and is used to control operations within a prefetch unit 6 and a decoder 8. The PSR is contained within the prefetch unit 6. A bypass mechanism 9 allows instructions to be supplied directly from the program memory 2 to the decoder 8 in some circumstances.

Figure 2:
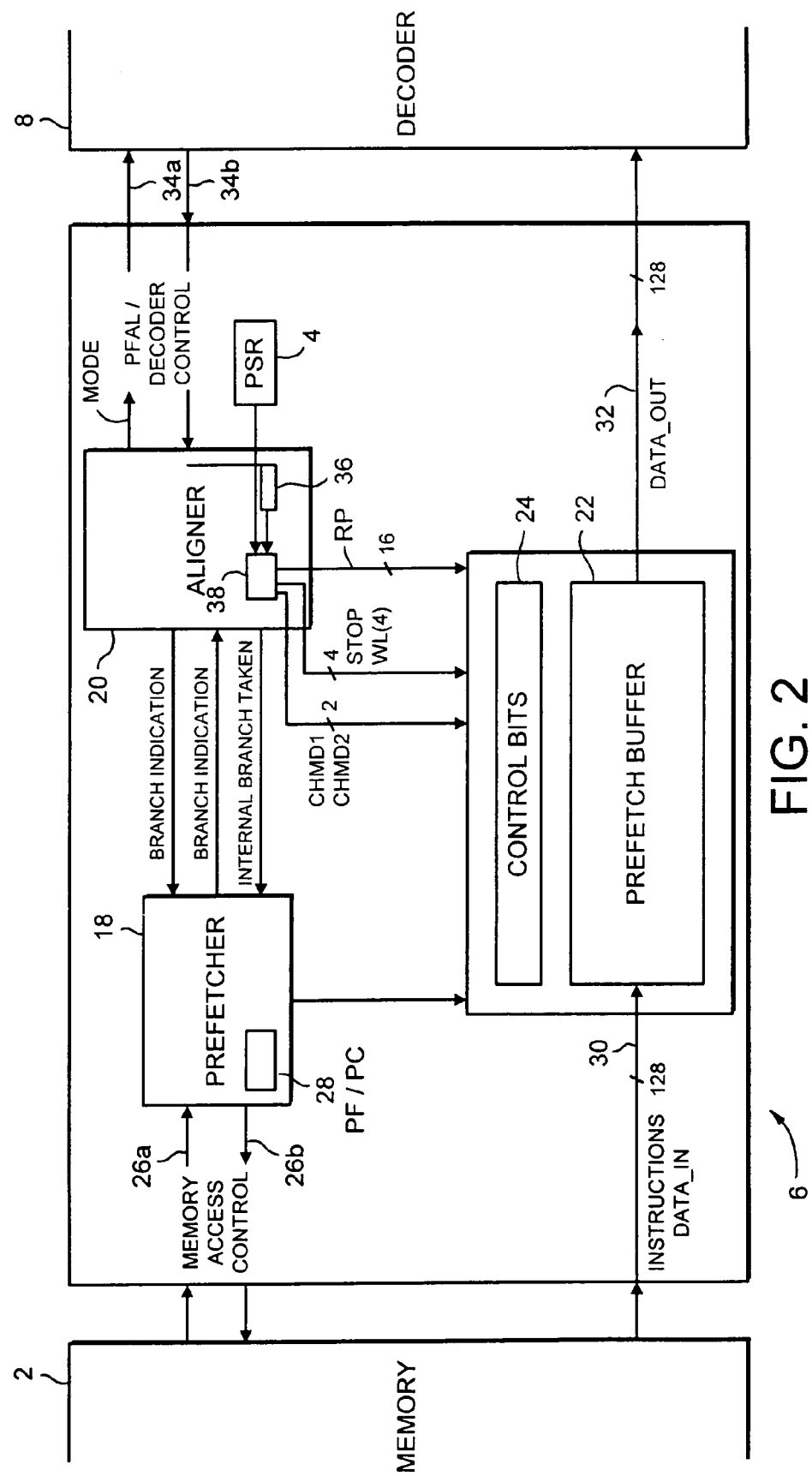
FIG. 2 is a block diagram of a prefetch unit.

The basic operation of the system can be described as follows. The prefecth unit 6 initiates memory accesses to the program memory 2. It fetches successive 128 bit sequences which define instructions from the program memory 2 and supplies them to the decoder 8. The functioning of the prefetch unit 6 will be described in greater detail below with reference to FIGS. 2 and 3. The decoder 8 decodes the instructions which it receives from the prefetch unit 6 and supplies them to the microinstruction generator 10, which generates microinstructions. These microinstructions are either sent to a Data Instruction Data Queue (D-IDQ) from where they pass into data execution units EXU1,EXU2, or into an Address Instruction Data Queue (A-IDQ) from where they pass into address execution units EXU3,EXU4 or general execution unit EXU5. Data execution units EXU1,EXU2 share a common data register file 12 and address execution units EXU3,EXU4 share a common pointer register file 14.

General execution unit EXU5 shares some resources with the address execution units EXU3,EXU4 but has its own control register file 16. A load data queue (LDQ) and pointer data queue (PDQ) provide a queuing mechanism for data and pointers from a main data memory (not shown) to the register files 12,14,16. A store address/data queue (SAQ/SDQ) provides a queuing mechanism for data and addresses awaiting access to the main memory. A data queue (DDQ) allows queuing of data being transferred between the register files 12,14,16.

The embodiment of the invention concerns the performance of so-called "hardware loops" and is therefore related mainly to the program memory 2, the prefetch unit 6 and the decoder 8.

A hardware loop is a sequence of instructions identified in hardware terms rather than software terms which is to be performed a number of times. A more detailed operation of the prefetch unit 6 will now be described with reference to FIG. 2.

The prefetch unit 6 comprises a prefetch buffer 22 with associated control bits 24 and control circuitry, the control circuitry comprising the PSR 4, a prefetcher 18 and an aligner 20. The prefetcher 18 initiates memory accesses to program memory 2 using program memory access control signals 26a,26b. The address in the program memory 2 to which a fetch is initiated is held in a prefetch program counter 28 in the prefetcher 18. In response to a memory fetch initiated by the prefetcher 18, instruction words are supplied from the program memory 2 to the prefetch buffer 22 along instruction data-in path 30.

The aligner 20 controls sending of instructions from the prefetch buffer 22 to the decoder 8, these instructions being passed along data-out path 32. To do this, the aligner 20 issues and is responsive to prefetcher align (PFAL)/decoder control signals 34a,34b. The aligner 20 has an align program counter 36 which controls read ports (not shown) for supplying instructions to the decoder, in dependence on the instruction mode and the consequential number of machine cycles required for decoding each instruction word. It also keeps track of how many instructions have been dispatched to the decoder 8 in each machine cycle, and has a state machine 38 which generates a read pointer (RP) for controlling the prefetch buffer, in accordance with the instruction mode stored in the PSR 4. If the instruction mode changes, the aligner 10 issues change mode signals chmd1, chmd2 which initiate changes in the handling of signals for supply to the decoder, the details of which are not given here.

In short, the purpose of the prefetcher 18 and the aligner 20 together is to ensure that there is provided a continuous supply of instructions to the decoder in the correct mode.

Figure 3:
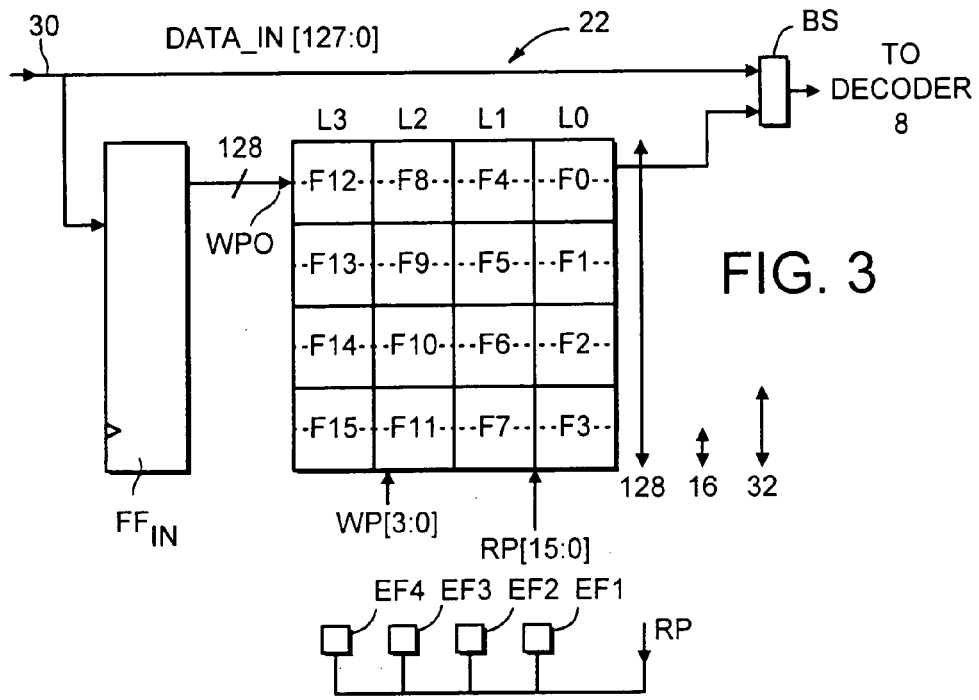
FIG. 3 illustrates the organisation of a prefetch buffer.

The organisation of the prefetch buffer 22 is illustrated in FIG. 3. In diagrammatic terms, the prefetch buffer can be considered to have four successive lines L0 to L3, each having a capacity of 128 bits. It has a single write port (WP0) which has a width of 128 bits and which receives data from the program memory via the instruction data-in path 30 and an input latch FF-in and writes it into the selected line under the control of a write pointer WP [3:0]. Each of the four lines F0 to F3 comprises four storage locations, thus making sixteen storage locations in total. The sixteen storage locations are denoted F0 to F15. Each has a capacity of 32 bits and is shown diagrammatically divided into two 16 bit sections for the purposes of explanation. Each line L0 to L3 is referred to herein as a group of storage locations and has capacity for one 128 bit line (in the form of an instruction word) from memory. This allows up to four successive memory accesses to be made, even if the first instruction word has not been received or executed by the decoder 8.

The control bits 24 of the prefetch buffer 22 described above in FIG. 2, include empty flags EF1 to EF4 which correspond to prefetch buffer lines L0 to L3 respectively. These flags indicate when their corresponding line is completely empty, such that a subsequent memory fetch can be initiated. Following a fetch, data is received by the prefetch buffer and the empty flag is cleared to indicate that that line is now full.

Figure 4:
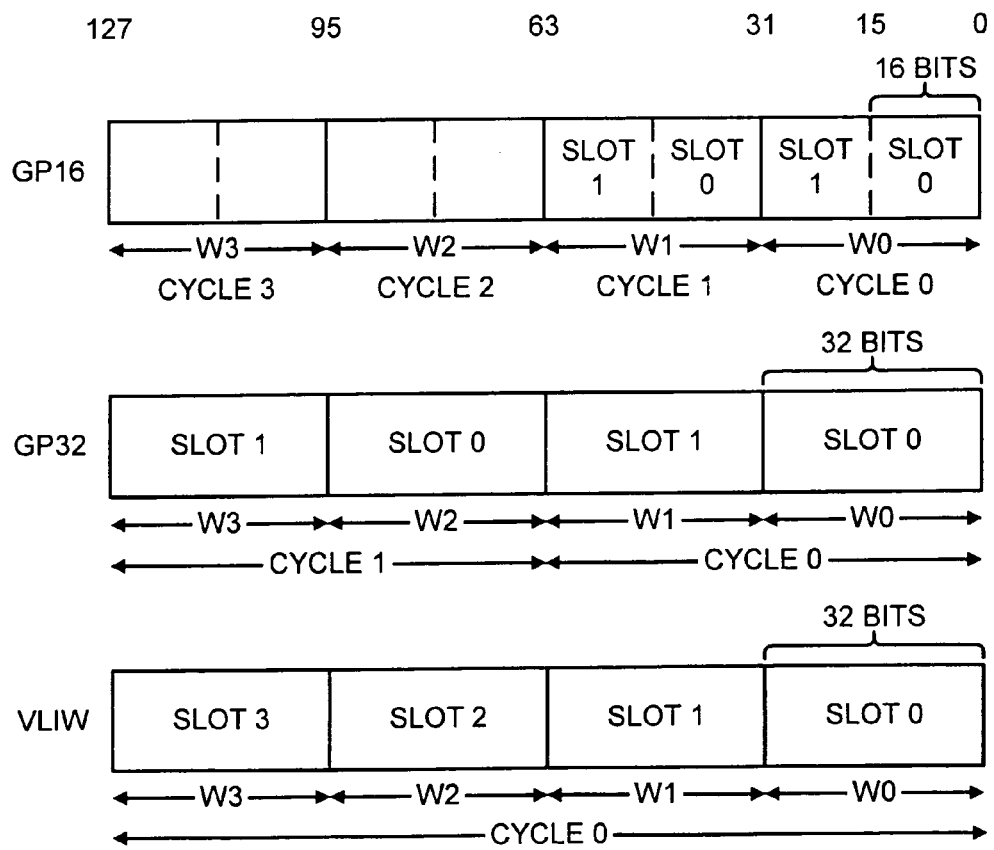
FIG. 4 illustrates three different instruction modes.

The three different instruction modes of the machine will now be described with reference to FIG. 4. These modes determine the format of the data which is supplied during each machine cycle from the prefetch unit 6 to the decoder 8. In all modes, each memory access by the prefetch unit 6 to the program memory 2 retrieves an instruction word of 128 bits in length.

According to a first instruction mode, a pair of 16 bit instructions are supplied, denoted slot 0,slot 1 in bit sequences w0, w1, etc. Each retrieved instruction word comprises eight 16 bit instructions formed from eight pairs, which are stored in storage locations L0–15 of the prefetch buffer 22 in two 16 bit sections as mentioned above. This is referred to herein as GP16 superscalar mode.

According to a second instruction mode, two instructions each having a length of 32 bits are supplied to the decoder from the prefetch buffer in each machine cycle, for example w0,w1 in CYCLE 0. Each retrieved instruction word comprises four 32 bit instructions. This mode is referred to herein as GP32 superscalar mode.

According to a third instruction mode, four instructions w0,w1,w2,w3 each of 32 bits in length are supplied to the decoder in each machine cycle. Each retrieved instruction word comprises four 32 bit instructions. This is referred to herein as Very Long Instruction Word (VLIW mode. In VLIW mode, the four 32 bit instructions are related according to predefined grammatical rules.

Each retrieved instruction word is decoded by the decoder 8 and supplied to the microinstruction generator 10 along four possible channels, labelled slot0,slot1,slot2,slot3. Each instruction word can give rise to a number of microinstructions which can be microinstructions for both the data execution units EXU1,EXU2 and the address execution units EXU3,EXU4.

In normal operation, while instructions from one of lines L0 to L3 are being decoded, memory fetches can be continued and instruction words (128 bits) stored in the other lines to keep the prefetch buffer 22 full. For example, by the time that a memory fetch has been made into the last line L3, it is most likely that the first line L0 will have been completely read out into the decoder and will therefore be ready to receive a subsequent instruction word from memory. Empty flag EF1 will indicate this. The number of machine cycles required to decode an instruction word varies depending on the instruction mode of the machine. That is, one cycle is needed in VLIW mode, two cycles in GP32 mode and four cycles in GP16 mode.

As a minimum of one cycle is required for reading and decoding, the use of the prefetch buffer hides memory latency.

Execution of hardware loops involves executing a sequence of instructions held in the program memory a number of times. As described earlier for normal operation, the prefetcher 18 initiates fetching of each 128 bit instruction word from the program memory 2 and stores it in an empty line L0 to L3 of the prefetch buffer. Empty flags EF1-4 indicate whether lines L0 to L3 are free to receive data. After execution of all the instructions in a line, the empty flag for that line is set and the prefetcher fetches another instruction word from the program memory and stores it in the free line. If this normal operation is used for loops, this implies repeated access between the prefetcher and the program memory to repeatedly retrieve the same loop instructions.

Figure 5:
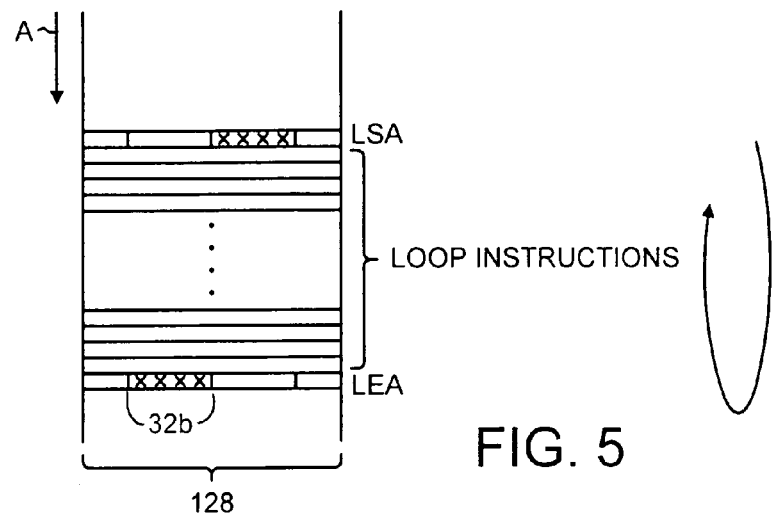
FIG. 5 is a sketch showing loop instructions in program memory.

Reference is now made to FIG. 5 to illustrate a loop. FIG. 5 illustrates diagrammatically a sequence of instructions in the program memory. Arrow A denotes the direction in which the instructions are to be executed. The instructions are arranged in 128 bit instruction words. The example given is in GP32 mode wherein each instruction has a length of 32 bits. The first instruction in the loop is denoted by a loop start address (LSA) as illustrated by the hatched instructions in FIG. 5. The last instruction in the loop is denoted by the loop end address (LEA). The loop start address (LSA) is held in a loop start register (LSR) and the loop end address (LEA) is held in a loop end register (LER). As a program may have a number of loops, there are a plurality of loop start registers and loop end registers for holding the respective start and end addresses of each of the loops. Each time a loop is to be performed, the computer system described herein detects whether or not the loop instructions are all held within the prefetch buffer.

Figure 6:
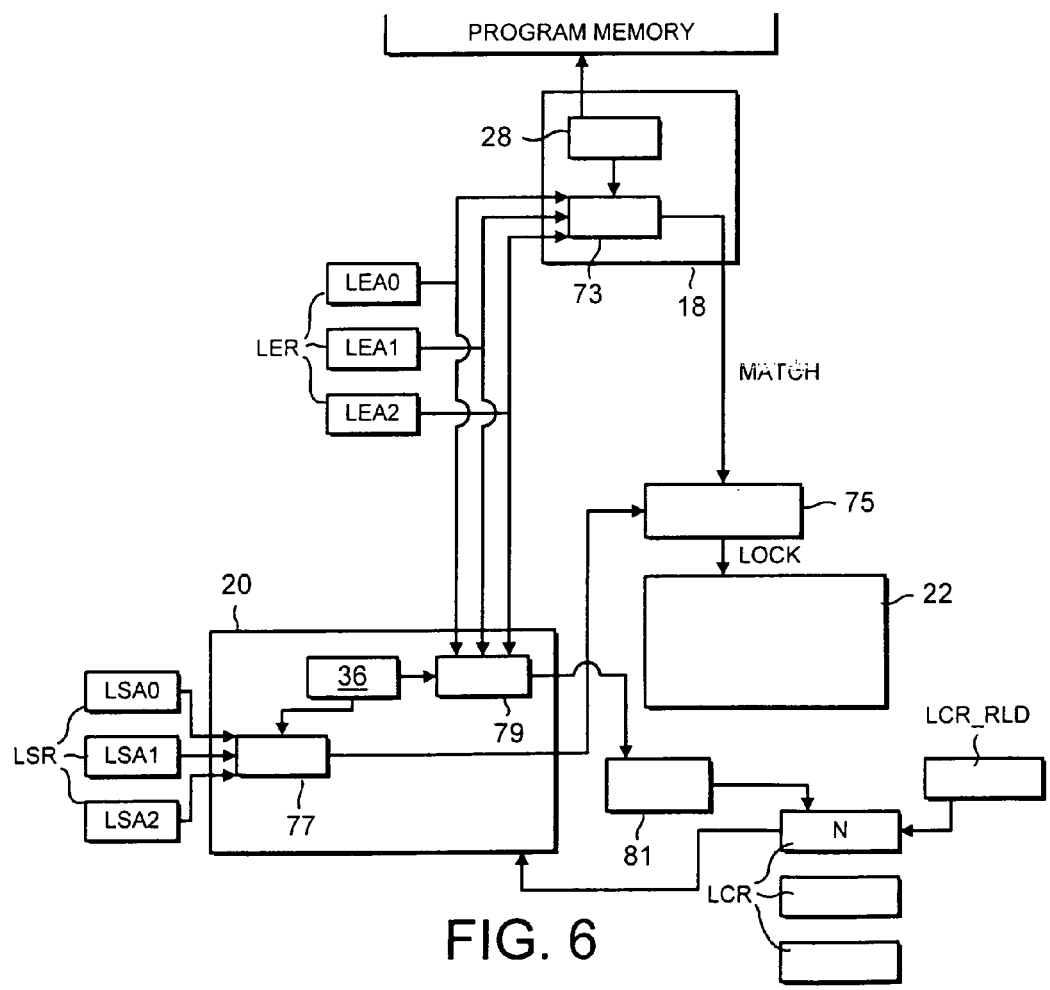
FIG. 6 is a block diagram illustrating the hardware loop mechanism.

Reference is now made to FIG. 6. To detect whether a particular hardware loop is entirely contained within the prefetch buffer 22, every time the prefetcher 18 requests an instruction word, it compares at comparator 73 the address which is sent from the program counter 28 to retrieve the instruction word with all the Loop End Registers (LER). Each Loop End Register (LER) indicates the address LEA0, LEA1,LEA2 of the last instruction of a particular hardware loop. If the sent address matches a loop end address the fact that there is a match is sent to a special buffer 75 which is closely linked to the prefetch buffer. Concurrently, every time that the aligner sends an instruction to the decoder, it checks at a comparator 77 addresses in the Loop Start Registers (LSR) against the address in the align program counter 36. Hence, the aligner is able to check whether that instruction corresponds to a loop start instruction. If the instruction does correspond and the LER address match of the same hardware loop is stored in the special buffer, this means that the loop is entirely included in the prefetch buffer 22. In this case, a lock signal is sent to the prefetch buffer 22.

The lock signal triggers a lock to be put on the prefetch buffer 22 so that the hardware loop can be entirely performed within it. This means that all the loop instructions are held within the prefetch buffer 22 for as many times as they are required to be executed. Thus, the lock signal prevents the empty flags for lines L0 to L3 being set until the loop has been executed the requisite number of times and it prevents instructions being sent to the decoder 8 directly via the bypass unit 9. Since there is no need to repeatedly fetch the loop instructions from the program memory 2, power consumption is reduced and the buses which would be used for this purpose can be used for other purposes. In other words, a powersave can effectively be applied to the core. The loop is then executed as any other instructions, that is, the PSR 4 stores the current instruction mode and the read pointer RP controls the prefetch buffer accordingly to send instructions to the decoder along the data-out path 32. After the loop has been executed for the first time, a decision needs to be made whether to execute the loop again or allow new instructions to be loaded. This is achieved as follows.

At the start of a hardware loop performed within the prefetch buffer, a Loop Counter Register (LCR) is set to the number N of times which the loop must be performed. The value N is held in a register labelled LCR_RLD in FIG. 6. A counter 81 decrements the value in the loop counter register LCR each time the aligner 20 detects at a comparator 79 that the loop end address has been reached, that is at each execution of the loop. When the loop counter register contains a value of one, that is, the last iteration of the loop, the lock signal is reset. This allows the empty flags EF1 to EF4 to be set thus allowing more instructions to be fetched from the program memory 2. During the last iteration, LCR=1, when the aligner detects the Loop End Address, the LCR register is automatically reloaded with the value contained in the LCR_RLD register. The machine is therefore ready to execute the same loop (or a different loop by changing the Loop Start Address and/or the Loop End Address) the given number of times, or a different number of times by reprogramming LCR.

Figure 7:
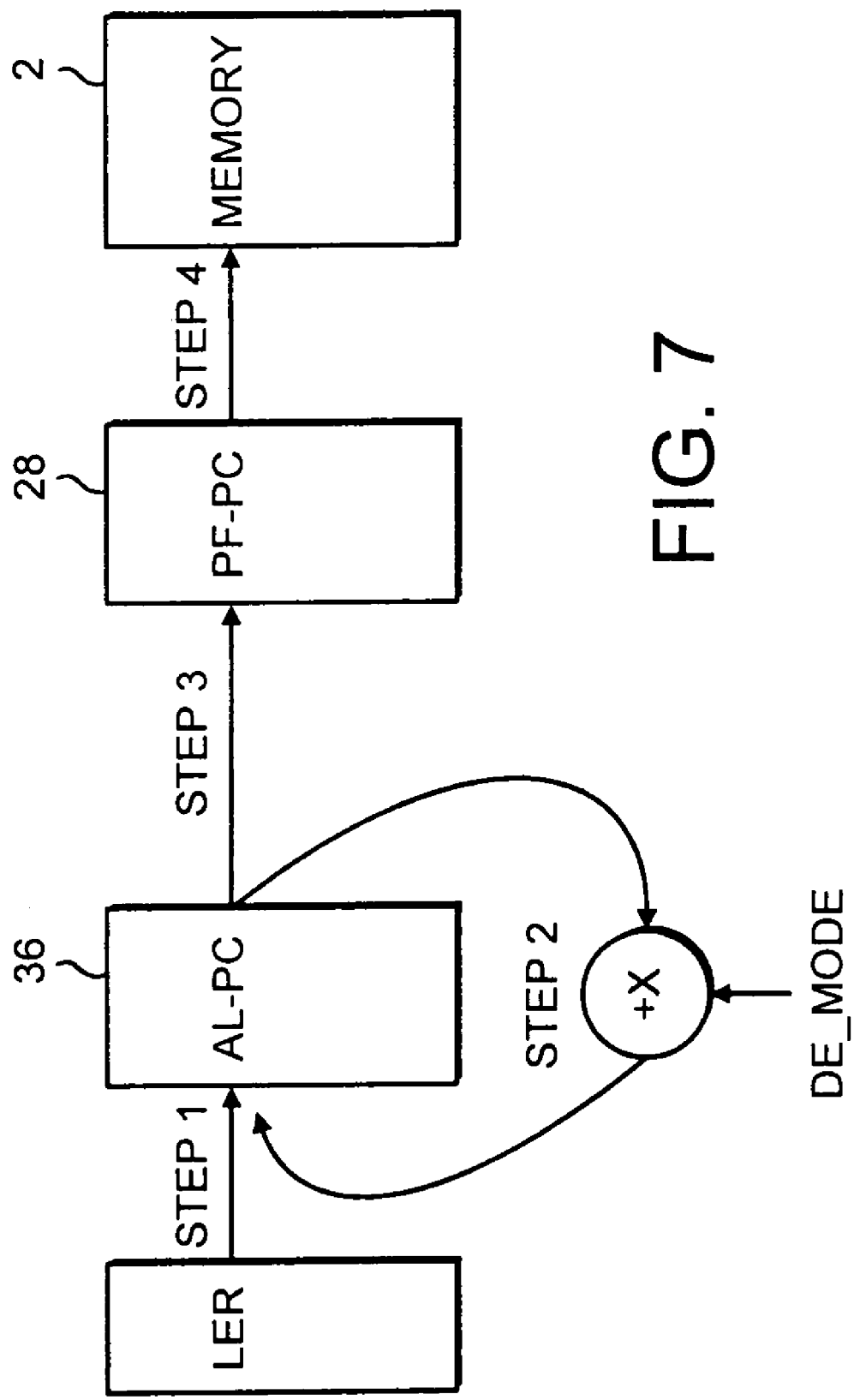
FIG. 7 is a flow diagram illustrating a loop skipping method.

The following describes the behaviour of the aligner when the loop count register contains a value of zero, with reference to FIG. 7.

On each cycle, the aligner 20 checks whether it has reached a loop start address or not (using the appropriate comparators).

When the aligner determines that the Loop Start Address of the loop has been reached, then if the value in the Loop Counter Register of the corresponding loop equals zero it invalidates the instructions currently sent to the decoder (i.e. the decoder 8 will not acknowledge the instructions corresponding to that loop start address). In a second step, the aligner 20 loads in the aligner program counter 36 the Loop End Address of the loop we are currently skipping. In a third step, the aligner 20 increments the value of the aligner program counter 36 by the appropriate amount (depending on the current mode (GP32/GP16/VLIW) so that the program counter 36 now indicates the address of the first instruction following the last instruction of the loop. In a last step, the aligner sends the value of the aligner program counter 36 to the Prefetch Program Counter 28. The prefetcher can now initiate new memory accesses from that location.

Note that while all these operations occur, the Loop Counter Register (LCR) is updated with the value in the Reload Loop Counter Register (LCR_RCD). This has therefore allowed the loop to be "skipped".

What is claimed is:

1. A computer system for executing loops comprising:
 a program memory holding a sequence of instructions including at least one loop sequence having a set of loop instructions to be executed a predetermined number of times;

a prefetch buffer for fetching instructions from the program memory;

means for detecting whether all of the loop instructions of the set are in the prefetch buffer and for locking the prefetch buffer against further accesses to the program memory solely in response to detecting that all of the loop instructions are in the prefetch buffer; and means for detecting when the loop sequence has been executed said predetermined number of times and releasing the lock on the prefetch buffer to allow further accesses to the program memory in response to detecting that the loop sequence has been executed said predetermined number of times, comprising a loop count register for holding a value representing said predetermined number and a counter operative to decrement the value in response to each time a last instruction in the loop sequence is reached.

2. A computer system according to claim 1, which includes at least one loop end register for holding the address of a last one of the loop instructions.

3. A computer system according to claim 1, which includes at least one loop start register for holding the address of a first loop instruction.

4. A computer system according to claim 1, which comprises a prefetcher for fetching instructions from the program memory in accordance with a fetch program counter.

5. A computer system according to claim 1, wherein the means for detecting whether all of the loop instructions of the set are in the prefetch buffer comprises:

an aligner which includes first comparing means for comparing an address of an instruction being output from the prefetch buffer with a loop start address, and second comparing means for comparing an address of an instruction being input to the prefetch buffer with a loop end address.

6. A computer system according to claim 5, wherein the aligner operates to cause generation of a lock signal for locking the prefetch buffer against further accesses to the program memory in response to the detection that all of the loop instructions of the set are in the prefetch buffer.

7. The computer system of claim 1, further comprising:

decoding circuitry to decode instructions received from the prefetch buffer.

8. A method of executing loops in a computer system, each loop comprising a sequence of loop instructions to be executed a predetermined number of times, the method comprising:

fetching instructions from a program memory into a prefetch buffer;

detecting whether all of the loop instructions of the sequence are in the prefetch buffer and, solely in response to detecting that all of the loop instructions are in the prefetch buffer, locking the prefetch buffer against further accesses to the program memory;

detecting when the loop has been executed said predetermined number of times, comprising holding a value representing said predetermined number in a loop count register and decrementing the value each time a last instruction in the loop is reached; and in response to the detecting when the loop has been executed said predetermined number of times, releasing the lock on the prefetch buffer to allow further accesses to the program memory.

9. A method according to claim 8, wherein the step of detecting whether all of the loop instructions of the sequence are in the prefetch buffer comprises comparing an address of an instruction being output from the prefetch buffer with a loop start address and comparing an address of an instruction being input to the prefetch buffer with a loop end address.

10. The method recited in claim 8, further comprising, for each execution of the loop:

sending each loop instruction to decoding circuitry to be decoded.

11. A computer system for executing loops comprising:

a program memory holding a sequence of instructions including at least one loop sequence having a set of loop instructions to be executed a predetermined number of times;

a prefetch buffer for fetching instructions from the program memory;

a loop instruction detector to detect whether all of the loop instructions of the set are in the prefetch buffer, and to lock the prefetch buffer against further accesses to the program memory solely in response to detecting that all of loop instructions are in the prefetch buffer; and a loop execution detector to detect when the loop sequence has been executed said predetermined number of times and to release the lock on the prefetch buffer to allow further accesses to the program memory in response to such detection, wherein said loop execution detector comprises a loop count register for holding a value representing said predetermined number and a counter operative to decrement the value in response to each time a last instruction in the loop sequence is reached.

12. The computer system of claim 11, further comprising:

decoding circuitry to decode instructions received from the prefetch buffer.

\* \* \* \* \*